Jan. 31, 1939. G. GALLONI ET AL 2,145,622
SPRING-ACTION HUB FOR VEHICLE WHEELS
Filed Feb. 20, 1936  2 Sheets—Sheet 1
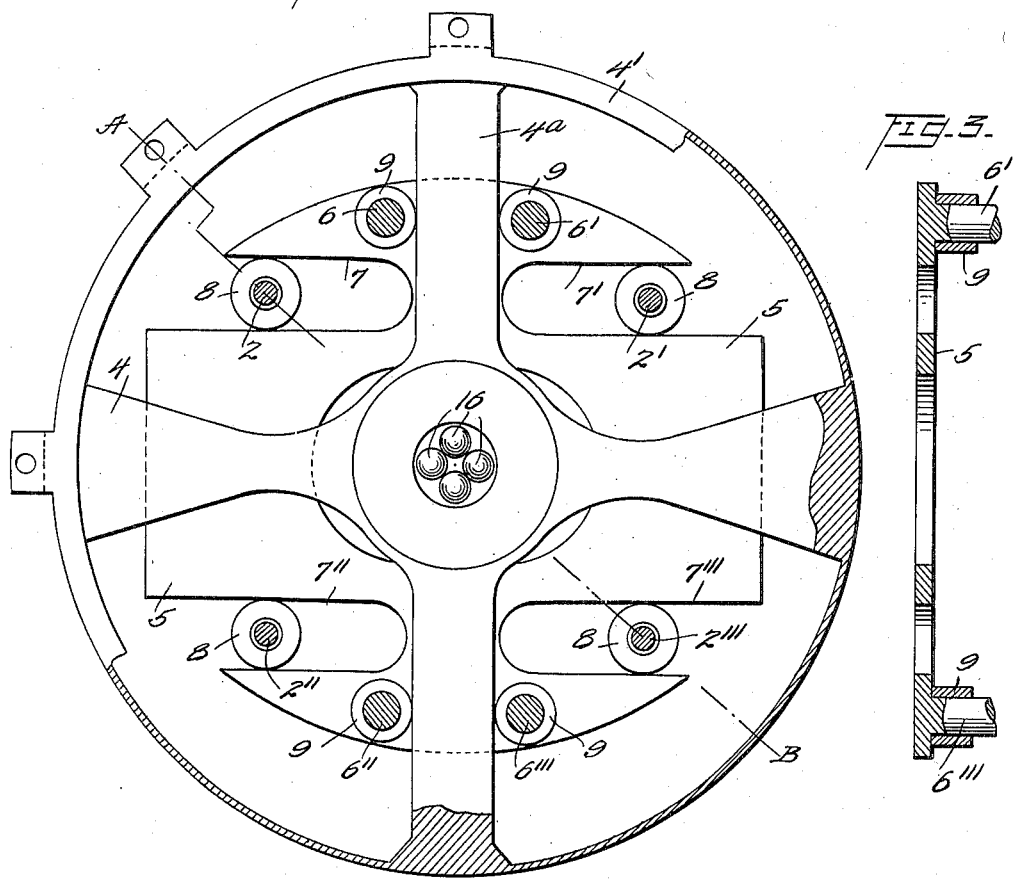
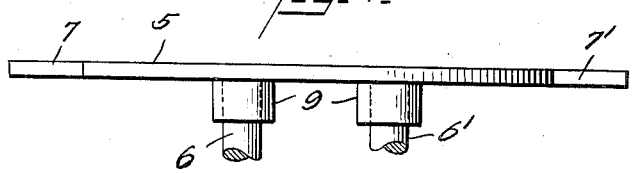

Jan. 31, 1939.  G. GALLONI ET AL  2,145,622
SPRING-ACTION HUB FOR VEHICLE WHEELS
Filed Feb. 20, 1936  2 Sheets-Sheet 2
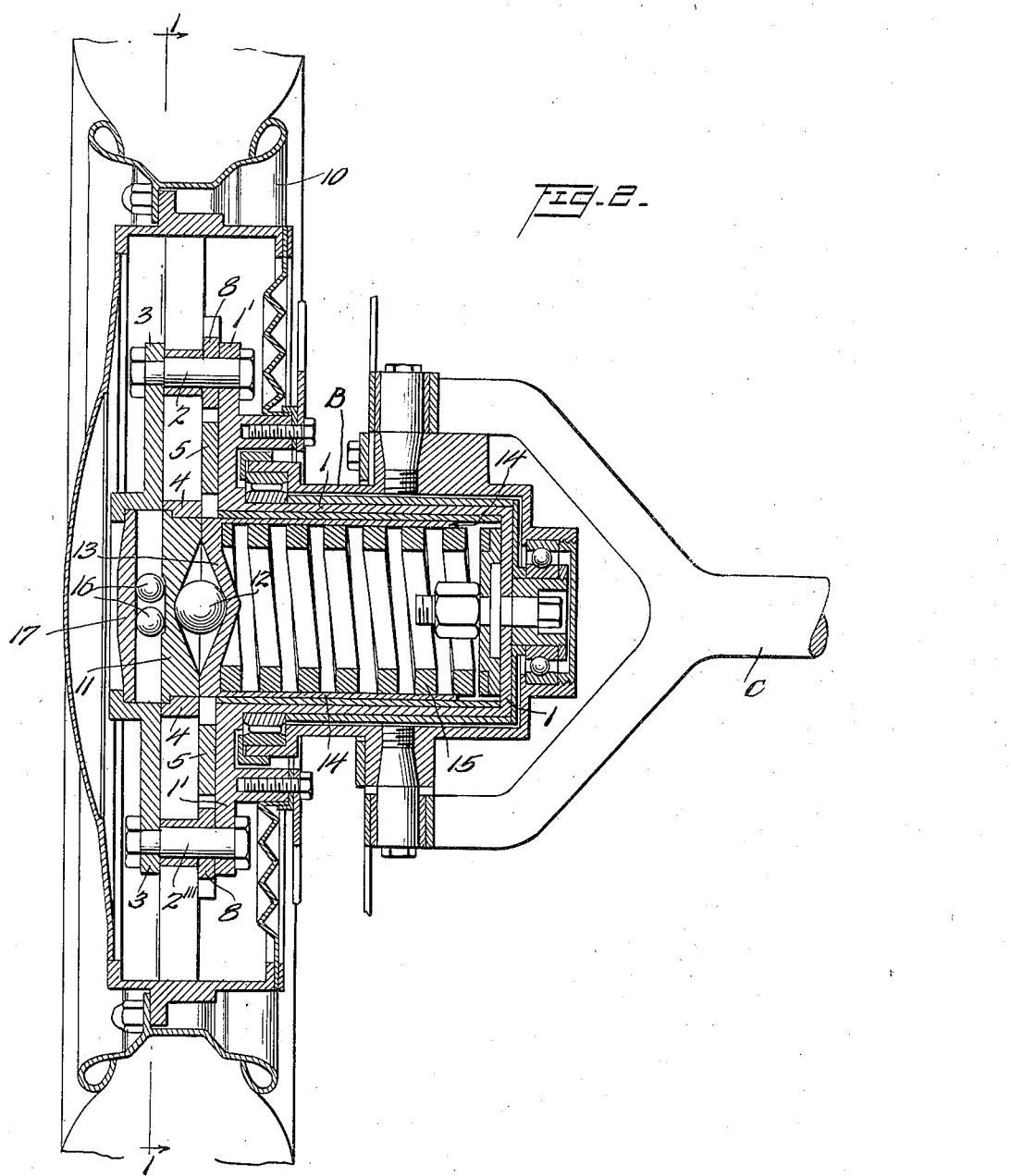
Inventor
Giorgio Galloni
and Claudio Poggi
By Watson, Cecil, Morse
& Grindle
Attorney Patented Jan. 31, 1939

2,145,622

UNITED STATES PATENT OFFICE 2,145,622

SPRING-ACTION HUB FOR VEHICLE WHEELS

Giorgio Galloni and Claudio Poggi, Bologna, Italy, assignors to Societa Italiana Brevetti Invenzioni, Bologna, Italy, a limited stock company of Italy Application February 20, 1936, Serial No. 64,964

4 Claims. (Cl. 152—45)

The present invention relates to spring action wheels and particularly to wheels adapted for use on motor vehicles such as automobiles and motorcycles. An object of the present invention is the provision of novel and improved means connecting the sprung and unsprung portions of the wheel whereby tractive effort may be imparted to the unsprung portion. A further object is the provision of a novel disposition of the spring means, whereby road shocks may be efficiently absorbed, the spring means taking no part in the transmission of power to the unsprung portion of the wheel, or of braking effort in the reverse direction.

Other and further objects, features and advantages will appear from the following description together with the accompanying drawings in which Fig. 1 is a vertical longitudinal section, on line 1—1 of Fig. 2, through the hub of a wheel constructed in accordance with the present invention;

Fig. 2 is a vertical transverse section on line A—B of Fig. 1;

Fig. 3 is a fragmentary transverse section of the connection member; and

Fig. 4 is an edge elevation of the connecting member.

The wheel of the present invention comprises essentially an unsprung portion, a horizontally acting coil spring, and a sprung portion revolubly mounted upon the axle of the vehicle. The particular construction illustrated is adapted for use as the front wheel of a motor vehicle, but may be easily adapted for use as a driving wheel. In the construction illustrated, a hollow cylindrical semiaxle 1 is revolubly mounted in suitable anti-friction bearings supported by a hollow wheel-supporting member B provided upon the end of an axle C. The semiaxle 1 is provided with an annular flange 1', to which a disc 3 is rigidly secured by bolts 2, 2', 2'', 2'''. A spider 4, having two opposed radial arms 4a provided with straight parallel sides, and having its several arms connected by an integral outer ring 4', lies between the flange 1' and the disc 3. A slotted disc 5 is disposed between the flange 1' and the spider 4, and is provided with anti-friction rollers 9, mounted upon studs 6, 6', 6'', 6''', arranged to engage the sides of the arms 4a of the spider 4, in order to maintain the angular relationship between the disc 5 and spider 4, while permitting relative movement therebetween in the direction of the arms 4a. The disc 5 is provided with pairs of opposed slots 7, 7', 7'', 7''', extending at right angles with the arms 4a of the spider 4, and adapted to receive anti-friction rollers 8 carried upon the bolts 2, 2', 2'', 2'''. It will be appreciated that the disc 5 thus constitutes a rigid driving connection between the semiaxle 1 and the spider 4, while at the same time permitting limited linear parallel movement therebetween in any direction. The outer ring 4' being rigidly secured to the wheel rim 10, it is apparent that turning effort imparted to the semiaxle 1 will be transmitted through the disc 5 and spider 4 to the rim 10.

A ball cushion 11 having a shallow conical bearing surface is rigidly secured within a central opening in the spider 4. An opposed bearing surface of similar shape is formed upon the end 13 of a hollow cylinder 14 which is slidably mounted within the semiaxle 1 and forms a casing for a coil spring 15. A ball 12 is carried between the ball cushion 11 and the end 13 of the cylinder 14. In order to withstand the outward thrust upon the ball cushion 11, balls 16 are provided and are retained in place by a member 17 mounted in a central aperture in the outer disc 3.

As will be obvious from the foregoing description, any relative movement of the spider 4 and semiaxle 1 will be resisted by the spring 15, which will be compressed, the cylinder 14 being forced to the right by reason of the shape of the bearing surfaces formed upon its end 13 and the ball cushion 11. It is thus apparent that road shocks acting upon the rim 10 will be absorbed and damped by the spring 15.

In the case of a driven wheel, the semiaxle 1 is rigidly connected to the usual axle member which is in turn connected to the differential gearing.

In applying the present invention to a motorcycle, the driving pinion will be mounted upon the semiaxle 1, and the outer disc 3 will be replaced by a semiaxle which may carry the brake drum. The two semiaxles may be mounted between the forks of the vehicle in the usual manner.

An important advantage of the present invention lies in the fact that the spring 15 and ball 12 lie in the center of rotation of the wheel, minimizing the effect of lateral shocks and friction. A further advantage is that the present construction reduces to a minimum the unsprung weight of the vehicle.

The terms and expressions employed in the foregoing specification are used in a descriptive, and not a limiting sense, and it is recognized that the described construction may be widely varied without departing from the scope of the present invention.

Having thus described the invention, what is claimed as new and desired to be secured by Letters Patent is:

1. In combination with a vehicle having a hollow wheel-supporting member, a vehicle wheel comprising a hollow semiaxle journalled in said wheel-supporting member, a rim coupled to said hollow semiaxle for limited linear parallel movement relative thereto, and a spring carried within said hollow semiaxle and adapted to be compressed axially of said hollow semiaxle by relative movement between said hollow semiaxle and said rim.

2. In combination with a vehicle having a hollow wheel-supporting member, a vehicle wheel comprising a hollow semiaxle journalled in said wheel-supporting member, a rim coupled to said hollow semiaxle for limited linear parallel movement relative thereto, a concave ball cushion secured to said rim, a second ball cushion slidably mounted within said hollow semiaxle, a ball between said ball cushions, and a spring mounted within said hollow semiaxle and adapted to be compressed axially of said hollow semiaxle by relative movement between said ball cushions.

3. A device according to claim 1 wherein the coupling between said hollow member and said rim comprises a spider and a slotted disc, said disc being provided with members slidably engaging opposed arms of said spider and said hollow member having projections slidably engaging said slots in said disc.

4. A device according to claim 2 in which said second ball cushion is concave and comprises an end of a hollow member slidably mounted within said hollow semiaxle and surrounding said spring.

POGGI CLAUDIO.
GALLONI GIORGIO.